(No Model.)
R. EWING.
EARTHENWARE SEWER PIPE JOINT.
No. 506,484. Patented Oct. 10, 1893.
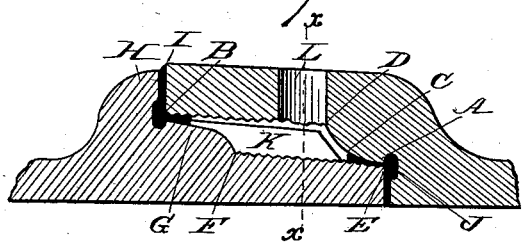
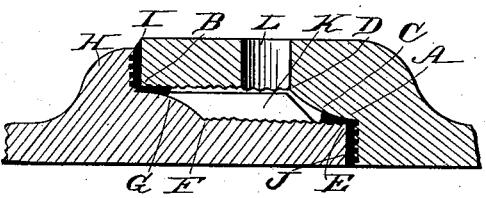
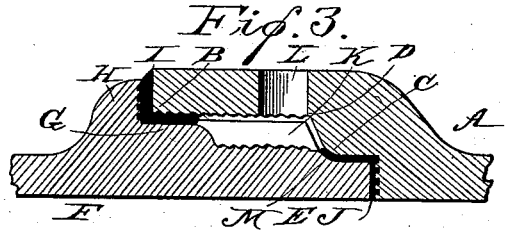
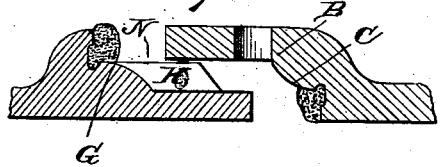
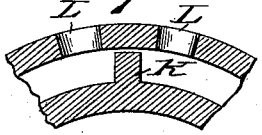
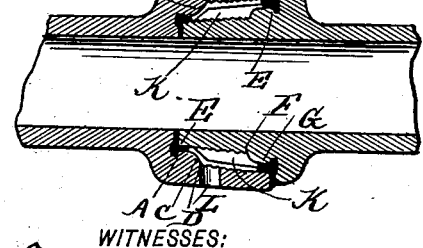
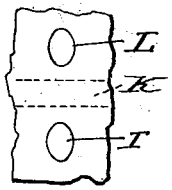
WITNESSES:
Fred G. Dieterich
Geo. H. Evans
INVENTOR
Robert Ewing
BY Munn & Co.
ATTORNEYS.

UNITED STATES PATENT OFFICE.

ROBERT EWING, OF LONDON, ENGLAND.

EARTHENWARE-SEWER-PIPE JOINT.

SPECIFICATION forming part of Letters Patent No. 506,484, dated October 10, 1893.

Application filed December 12, 1892. Serial No. 454,959. (No model.) Patented in England June 3, 1891, No. 9,360.

*To all whom it may concern:*

Be it known that I, ROBERT EWING, a subject of Her Majesty Queen Victoria, residing at 16 Shaftsbury Avenue, London, in the county of Middlesex, England, have invented certain new and useful Improvements in Joints for Earthenware Sewer-Pipes and for other Purposes, (for which I have received Letters Patent in Great Britain, No. 9,360, dated June 3, 1891;) and I do hereby declare that the following is a full, clear, and exact description of the invention, which will enable others skilled in the art to which it appertains to make and use the same.

This invention relates to improvements in the joints and jointing for earthenware sewer pipes, or other purposes, particularly in the kind or class of joint with ordinary faucet, and with external shoulder or flange on the plain or opposite end of pipe, made of the same material as and integral with the body of the pipe.

The objects of this invention are:

First. To provide an improved form of joint for earthenware sewer pipes, or other purposes; which, while having an ample internal space or chamber for the luting or grouting material and affording a double bearing to the spigot or plain end of the pipe (viz: a support to it at the bottom and mouth only of the socket) dispenses with the ring or annular rib at the lip of the socket, usual in such chambered or grouted joints; thereby diminishing the difficulties of making a sound joint, arising from the collection of sand or dirt in the annular recess in the socket, necessarily created by the presence of this outer annular rib or lip. It is found in practice that as neither this annular recess, nor this outer annular lip in a socket, can be formed conveniently by the metal die in an ordinary sanitary tube machine, this recess is usually formed by grooving out a part of, and taking from the original or normal thickness and strength of the wall of the socket; while the outer lip is not infrequently molded on separately or formed of a composition which is less durable than earthenware material, and adds so greatly to the cost of the pipes as to hinder their general use by the public.

Second. To provide without the molding on of any extraneous composition or material different from that of the body of the earthenware pipe, a joint closely or evenly fitting, especially at the invert or floor of the tube, notwithstanding the well known tendency of earthenware pipes ordinarily to "warp," or depart from the cylindrical form in the process of drying and burning.

In order that my invention may be fully understood and readily carried out I will describe the same by reference to the accompanying drawings.

Figure 1 is a longitudinal section of my improved joint, with socket and spigot slightly tapered. Fig. 2 is a longitudinal section of the same joint, but, with the sides of the socket and spigot not tapered as in Fig. 1, but running parallel with the sides of the body of the pipe. Fig. 3 is a longitudinal section of said improved joint with a shoulder near the end of spigot at M for the placing and holding of the plastic cement, instead of in the socket while the pipes are being laid. Fig. 4 shows the longitudinal section of my improved joint with the spigot and socket some distance apart to show the position of the plastic dressings and also that of the rib K before the pipes are driven home. Fig. 5 is a transverse section of the joint on line X X, Fig. 1, showing the position of the rib K on the spigot between the two holes L. Fig. 6 is a top view of a fragment of the socket at the two holes; showing the position of the rib on the spigot in dotted lines. Fig. 7 is a longitudinal section of two pipe sections.

I make the socket of my improved earthenware sewer pipe joint deeper than that of the ordinary joint and tapering outward from the bottom at A Fig. 1 to the mouth at B Fig. 1 in two degrees of taper; the inner or bottom taper from A to C being more acute than the outer from D to B; a shoulder being formed between D and C the point or place of change in the degrees of taper, near the bottom of the socket, and rounded or sloped to allow of the easy passage of the spigot into the narrow part thus formed in the socket, when the end of the one pipe is laid in that of the other ready for driving home. On the outside of the spigot end of the pipe there are also two degrees of taper; the one extending along the greater part of the length from the extreme end of the spigot at E to F Fig. 1, being less acute than the one widening up from G to the face of the external flange I Fig. 1 on the pipe; a shoulder being formed between F and G the point, or place of change in the degrees of taper; and rounded or sloped as in the socket.

Where the character of the clay or other material of which the pipe is formed will permit of it I dispense with the tapering above referred to in Fig. 1 on the sides of the spigot from E to F and of the socket from D to B and make the same parallel with the sides of the body of the pipe as in Fig. 2.

The face of the external shoulder or flange on the pipe at H Figs. 1, 2, and 3, abuts or nearly so against the end of the socket at I and is made slightly concave or recessed as in Fig. 1, or deeply scored as in Figs. 2 and 3, to receive and hold the band of clay or other plastic material, and prevent its being washed out especially when the pipes are laid in water.

When the pipes are driven home the band of clay or other plastic material placed in the angle at the bottom of the socket which is also slightly recessed or scored as at J Figs. 1, 2 and 3, and the band of clay or plastic cement placed on the face of the flange of the spigot at H Figs. 1, 2 and 3 are wedged in the joint and form a liquid-tight chamber parallel-sided or diamond shaped or nearly so as shown Figs. 1, 2 and 3.

Where the dressing of the plastic cement in the socket is liable to be washed out by the passage of water through the pipes during the process of laying, a small shoulder is formed near the end of the spigot as at M Fig. 3, on which plastic or other suitable material may be applied instead of in the socket; and to abut against the mouth of the narrow part of the socket at C Fig. 3.

To prevent the liquid cement passing both ways round the joint at the same time when it is poured in either one of the two holes, L, I provide a short rib on the spigot to pass between the two holes in the socket, see Fig. 5— and extending longitudinally from the front of the shoulder at G, Fig. 4, to a point near the end of the spigot and so sloped at the end as to abut against the face of the inner shoulder C D of the socket and so act as a barrier to the liquid cement at that part.

Having fully described my invention, what I claim, and desire to secure by Letters Patent, is—

1. A pipe joint comprising the socket section provided at the base of its socket in the angle thereof with an inclined or rounded shoulder C and with two transversely aligned apertures L L beyond the outer margin D of said shoulder, and the opposed section provided with an external annular flange H an inclined or rounded shoulder G in the angle of the shoulder, and the external rib K extending from the shoulder toward the end of the section and inclined or curved on its extremity to correspond with the shoulder C; the ends of the two sections overlapping the respective shoulders C G, and the said rib K extending between the two holes L, substantially as described.

2. A pipe joint comprising the socket section provided at the base of the socket in the angle thereof from A to D with an inclined or rounded shoulder C, and recessed or scored as at J, and provided beyond the point D with two transversely aligned apertures L L, and the opposed section formed with an external annular flange H (also scored or recessed) the face of the said shoulder being perpendicular to the bore of the section and against which the flat end of the socket or bell section abuts and with a shoulder G in the angle formed by said shoulder and the longitudinally extending rib K extending from the said shoulder toward the end of the section and shaped at its end to correspond with the shoulder C which it abuts; the ends of the pipe sections overlapping the respective shoulders C G, substantially as set forth.

3. The herein described pipe joint comprising the socket section having a shoulder D in the angle of its base inclined or curved from A to D, said socket being flared or inclined outwardly from the point D to B and provided with transversely aligned apertures L L and the opposed section formed with the external annular flange H the face of which is perpendicular to the bore of the section and against which the flat end of the socket or bell section abuts, shoulder G in the angle formed thereby said section being inclined from F to E and the longitudinal rib K, substantially as set forth.

Dated this 17th day of August, 1892.

ROBERT EWING.

Witnesses:
JOHN BARCLAY,
T. F. BARNES.